(12) United States Patent
Ferguson et al.

(10) Patent No.: US 9,353,808 B2
(45) Date of Patent: May 31, 2016

(54) BI-DIRECTIONAL CLUTCH LOCK

(71) Applicant: AMI Industries, Inc., Colorado Springs, CO (US)

(72) Inventors: Keith M. Ferguson, Colorado Springs, CO (US); Othar Kennedy, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 87 days.

(21) Appl. No.: 14/462,246

(22) Filed: Aug. 18, 2014

(65) Prior Publication Data

US 2016/0047429 A1    Feb. 18, 2016

(51) Int. Cl.

| | |
|---|---|
| G05G 5/06 | (2006.01) |
| G05G 5/18 | (2006.01) |
| F16D 49/00 | (2006.01) |
| G05G 5/12 | (2006.01) |
| B60N 2/08 | (2006.01) |
| B60N 2/07 | (2006.01) |

(52) U.S. Cl.
CPC F16D 49/00 (2013.01); G05G 5/12 (2013.01); *B60N 2/0727* (2013.01); *B60N 2/08* (2013.01)

(58) Field of Classification Search
CPC ....... F16D 49/00; F16D 49/16; F16D 63/008; F16D 65/54; G05G 5/12; G05G 5/18; G05G 5/24; B60T 7/104; B60N 2/0727; B60N 2/08; B64D 11/06; B64D 11/064; Y10T 74/20672; Y10T 74/20684
See application file for complete search history.

(56) References Cited

U.S. PATENT DOCUMENTS

| | | | | | |
|---|---|---|---|---|---|
| 2,479,830 | A | * | 8/1949 | Goepfrich | G05G 5/12 188/16 |
| 3,661,352 | A | * | 5/1972 | McFarlane | B60N 2/072 248/429 |
| 3,897,101 | A | * | 7/1975 | Hess | B60N 2/067 248/429 |
| 4,842,234 | A | * | 6/1989 | Koch | B64D 11/06 248/424 |
| 6,488,134 | B2 | * | 12/2002 | Becker | B60N 2/224 192/19 |
| 7,815,019 | B2 | * | 10/2010 | Chen | F16D 49/16 188/2 D |
| 7,887,020 | B2 | * | 2/2011 | Ferguson | B64D 11/06 248/424 |
| 8,628,053 | B2 | | 1/2014 | Marechal | |
| 2004/0089091 | A1 | | 5/2004 | Bechtel et al. | |

FOREIGN PATENT DOCUMENTS

| | | | | |
|---|---|---|---|---|
| DE | EP 0220734 A2 * | 5/1987 | ........... | A61G 5/1027 |
| DE | 4317348 | 12/1994 | | |
| DE | 102004011054 A1 * | 12/2004 | ........... | B60N 2/0806 |
| GB | 354477 A * | 8/1931 | ............. | B60T 7/104 |
| GB | 546183 | 7/1942 | | |

OTHER PUBLICATIONS

Extended European Search Report dated Jan. 4, 2016 in European Application No. 15181398.7.

* cited by examiner

*Primary Examiner* — Adam D Rogers
(74) *Attorney, Agent, or Firm* — Snell & Wilmer, L.L.P.

(57) ABSTRACT

A bi-directional linear clutch lock is provided that may selectively restrain a rack from translating. A bi-directional rotary clutch lock is provided that may selectively restrain a rotary rack from rotating.

15 Claims, 5 Drawing Sheets

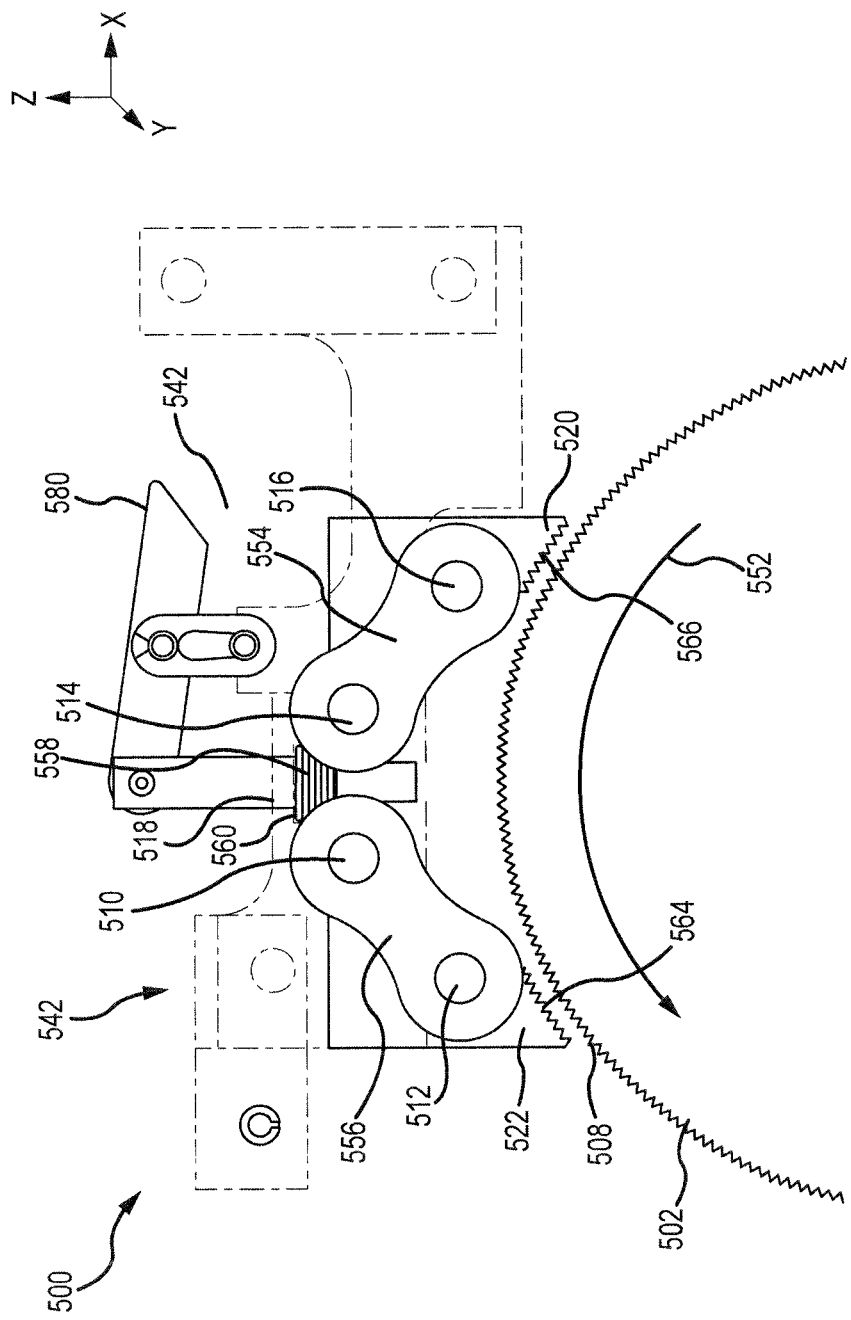

US 9,353,808 B2

BI-DIRECTIONAL CLUTCH LOCK

FIELD

The present disclosure relates generally to bi-directional clutch locks.

BACKGROUND

In various applications, such as in aircraft seating, a clutch lock may be used to lock at least one of rotation or linear translation. However, conventional clutch locks typically occupy large envelopes, are not particularly robust, and do not allow for fine locking increments. In addition, conventional clutch locks typically operate in a single direction only.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A bi-directional linear clutch lock is provided comprising a rack, a first clutching link and a second clutching link, the first clutching link pivotably mounted to a moveable housing at a first housing pivot mount and the second clutching link pivotably mounted to the moveable housing at a second housing pivot mount, a first pawl pivotably mounted to the first clutching link at a first pivot mount, a second pawl pivotably mounted to the second clutching link at a second pivot mount, wherein the first pivot mount is more proximate to the second pivot mount than the second housing pivot mount, wherein the first pawl and the second pawl are configured to engage the rack in response to movement of the moveable housing towards the rack.

A bi-directional rotary clutch is provided comprising a rotary rack configured to rotate, a first clutching link and a second clutching link, the first clutching link pivotably mounted to a moveable housing at a first housing pivot mount and the second clutching link pivotably mounted to the moveable housing at a second housing pivot mount, a first pawl pivotably mounted to the first clutching link at a first pivot mount, a second pawl pivotably mounted to the second clutching link at a second pivot mount, wherein the first housing pivot mount is more proximate to the second housing pivot mount than to the second pivot mount, wherein first pawl and the second pawl are configured to engage the rotary rack in response to movement of the moveable housing towards the rotary rack.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 6 illustrates a bi-directional rotary clutch lock in a disengaged state, in accordance with various embodiments.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option.

Bi-directional clutch locks, bi-directional linear clutch locks and bi-directional rotary clutch locks are disclosed herein. As described herein, bi-directional linear clutch locks and bi-directional rotary clutch locks may be useful in aircraft seating and other aircraft interior applications and other industrial applications to provide, for example, fine locking increments, high locking strength, and a small space envelope.

Figure 1:
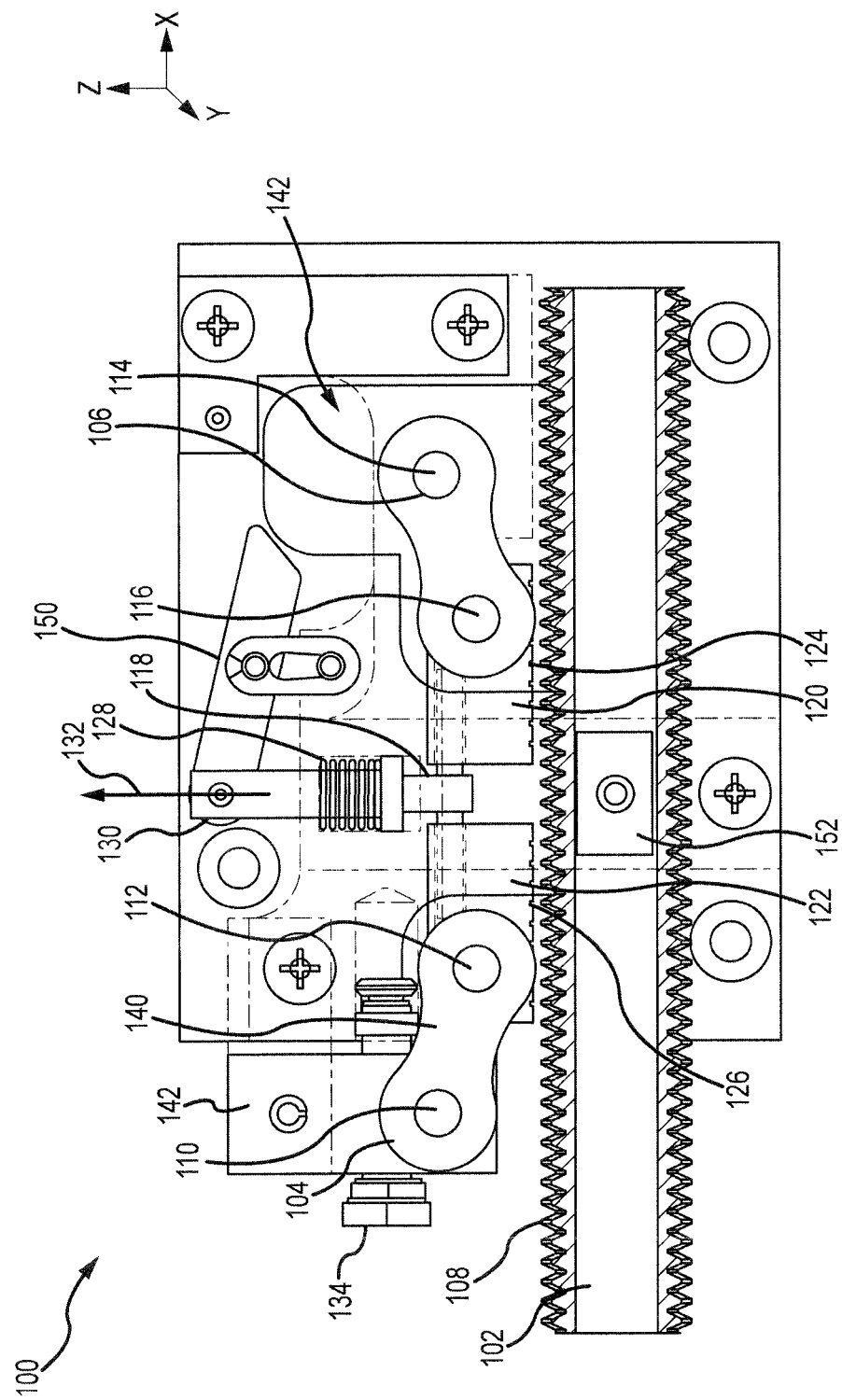
FIG. 1 illustrates a bi-directional linear clutch lock in a disengaged state, in accordance with various embodiments.

With reference to FIG. 1 bi-directional linear clutch lock 100 in a disengaged state is illustrated using an x, y, and z axes for ease of illustration. Rack 102 is shown proximate first pawl 120 and second pawl 122. First pawl 120 is pivotably mounted to first clutching link 106 at first pivot mount 116 First pivot mount 116 may comprise a dowel, rod, or other joint that allows first pawl 120 to pivot with respect to first clutching link 106. Second pawl 122 is pivotably mounted to second clutching link 140 at second pivot mount 112. Second pivot mount 112 may comprise a dowel, rod, or other joint that allows second pawl 122 to pivot with respect to second clutching link 140. As shown, first pivot mount 116 is more proximate to the second pivot mount 112 than the second housing pivot mount 110. Stated another way, first pivot mount 116 is closer along the x axis to the second pivot mount 112 than the second housing pivot mount 110

First clutching link 106 is pivotably mounted to moveable housing 142 at first housing pivot mount 114. First housing pivot mount 114 may comprise a dowel, rod, or other joint that allows first clutching link 106 to pivot with respect to moveable housing 142. Second clutching link 140 is pivotably mounted to moveable housing 142 at second housing pivot mount 110. Second housing pivot mount 110 may comprise a dowel, rod, or other joint that allows second clutching link 140 to pivot with respect to moveable housing 142.

In that regard, first pawl 120 and second pawl 122 may move (i.e., may have a degree of freedom) along the z axis in response to first clutching link 106 and second clutching link 140 pivoting about at first housing pivot mount 114 and second housing pivot mount 110. In addition, first pawl 120 and second pawl 122 may move (i.e., may have a degree of freedom) along the x axis in response to pivoting with respect to first clutching link 106 and second clutching link 140. Thus, first pawl 120 and second pawl 122 may be manipulated with respect to rack 102 along the x axis and along the z axis. Alignment along the z axis may cause first pawl 120 and second pawl 122 to engage rack 102, as discussed below. Alignment along the x axis may cause first pawl 120 and second pawl 122 to better engage the rack mating surface 108 of rack 102, as discussed below.

Moveable housing 142 may comprise one or more members configured to move along the z axis. Moveable housing 142 is labeled twice in FIG. 1 to better illustrate the structure of moveable housing 142. For example, moveable housing 142 may comprise spring loaded plunger 130, rotating member 150, and dowel 118. Dowel 118 traverses spring loaded plunger 130 along the x axis. Spring loaded plunger may comprise spring 128. Spring 128 may be configured to bias spring loaded plunger in a negative z direction and, thus, spring 128 exerts a force on moveable housing 142 in the negative z direction. Thus, with momentary reference to FIG. 2, spring 128 exerts a force in the negative z direction that urges first pawl 120 and second pawl 122 toward rack 102. In turn, first pawl 120 and second pawl 122 are held in contact with rack 102. In response to force 132 exerted on spring loaded plunger 130, the force of spring 128 may be overcome and, depending upon the amount of displacement, a locking mechanism may lock spring 128 in an at least partially compressed state. In that regard, moveable housing 142 may move in a positive z direction. In turn, first pawl 120 and second pawl 122 move along the z axis and may disengage from rack 102. Force 132 may be exerted by rotating member 150.

Moveable housing 142 may comprise backlash adjustment 134. Backlash adjustment 134 may cause one or more members of moveable housing 142 to move along the x axis, both in the positive and negative x directions. In that regard, backlash adjustment 134 may adjust the distance along the x axis between first pawl 120 and second pawl 122. Stated another way, backlash adjustment 134 may adjust the distance along the x axis between first housing pivot mount 114 and second housing pivot mount 110. In this regard, the mating of first pawl 120 and second pawl 122 with rack 102, as described below, may be adjusted. Backlash adjustment 134 may comprise a screw, bolt, or other feature that may move a portion of moveable housing 142 along the x axis.

First pawl 120 comprises a first mating surface 124 and second pawl 122 comprises a second mating surface 126. Rack 102 comprises rack mating surface 108. First mating surface 124 and second mating surface 126 may be complementary to rack mating surface 108. In this regard, first mating surface 124 and second mating surface 126 may be configured to mate with rack mating surface 108. First mating surface 124 and second mating surface 126 may be configured to mate with rack mating surface 108 and may comprise, for example, gear teeth comprising any suitable tooth profile, concentric grooves, a fine thread, a coarse thread, a sharp V thread, and the like. For example, first mating surface 124 and second mating surface 126 may comprise male threads and rack mating surface 108 may comprise female threads. Mating surfaces may be adjusted depending upon a variety of factors, including how fine or coarse adjustment increments are desired. Rack 102 is configured to slide along the x axis on guide track 156, as shown in both FIGS. 2 and 3. In that regard, guide track 156 restrains rack 102 from rotation about the x axis. Rack 102 is also mounted to guide block 152.

Guide block 152 prevents deflection along the negative z axis due to the bearing force of first pawl 120 and second pawl 122.

Figure 3:
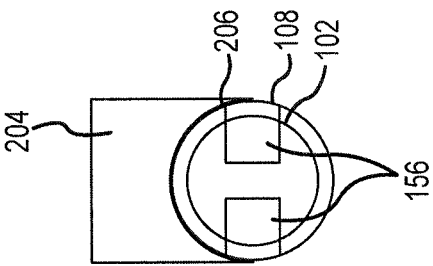
FIG. 3 illustrates a cross sectional view of a pawl interacting with a rack, in accordance with various embodiments.

With reference to FIG. 3, a cross sectional view of a rack and pawl is shown. Exemplary pawl 204 is shown having exemplary first mating surface 206. Rack 102 is shown with rack mating surface 108. Exemplary first mating surface 206 comprises male threads. In various embodiments, rack mating surface 108 comprises female threads that are configured to engage with the male threads of exemplary first mating surface 206

Figure 2:
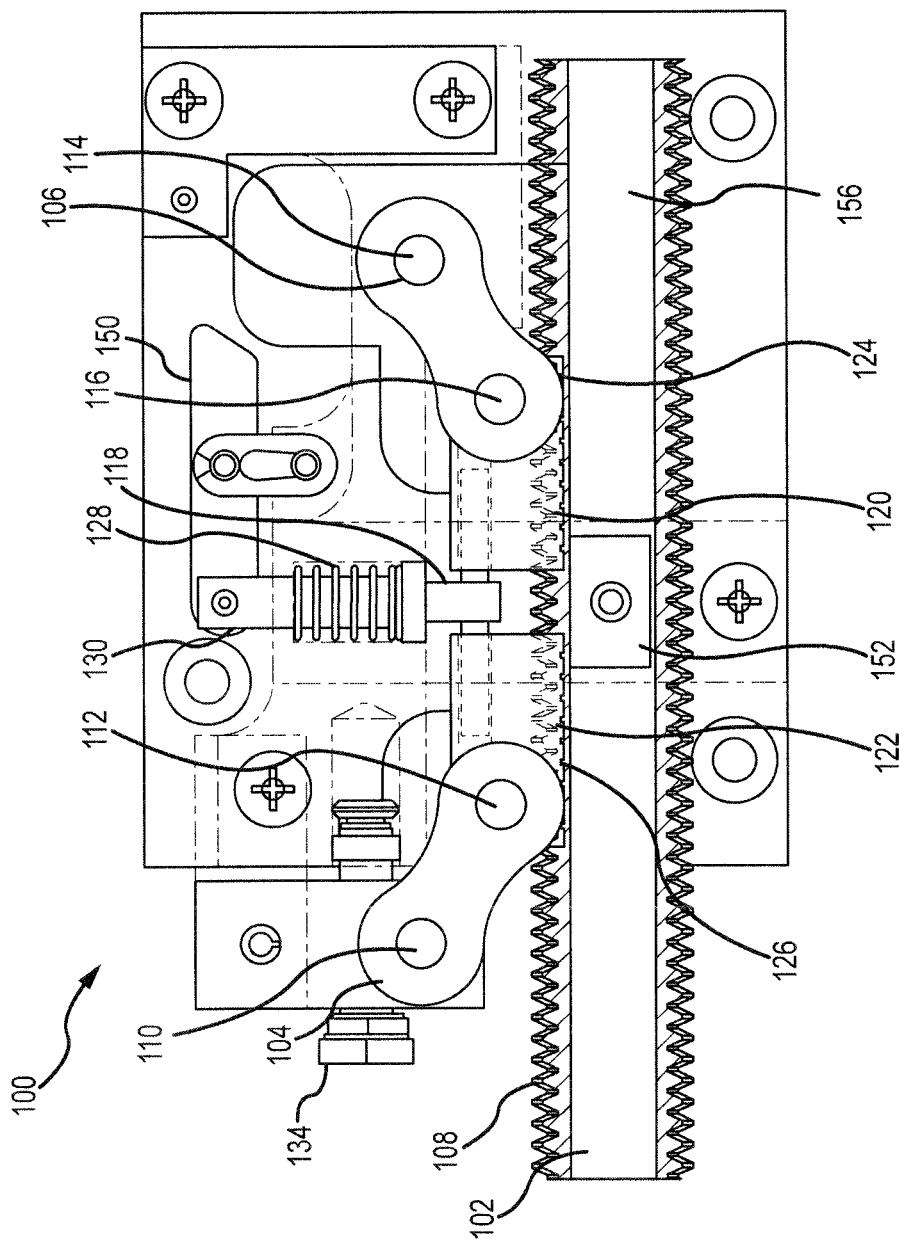
FIG. 2 illustrates a bi-directional linear clutch lock in an engaged state, in accordance with various embodiments.

With reference to FIG. 2, bi-directional linear clutch lock is shown in an engaged state. In that regard, with brief reference also to FIG. 1 to reference the disengaged state, the disengaged state comprises first pawl 120 and second pawl 122 not in contact with rack 102. Stated another way, in the disengaged state, first pawl 120 and second pawl 122 are separated from rack 102 along the z axis. In the engaged state, at least a portion of first pawl 120 and second pawl 122 are in contact with rack 102. As described above, spring 128 on spring loaded plunger may urge first pawl 120 and second pawl 122 towards rack 102 until first pawl 120 and second pawl 122 engage rack 102.

Figure 4:
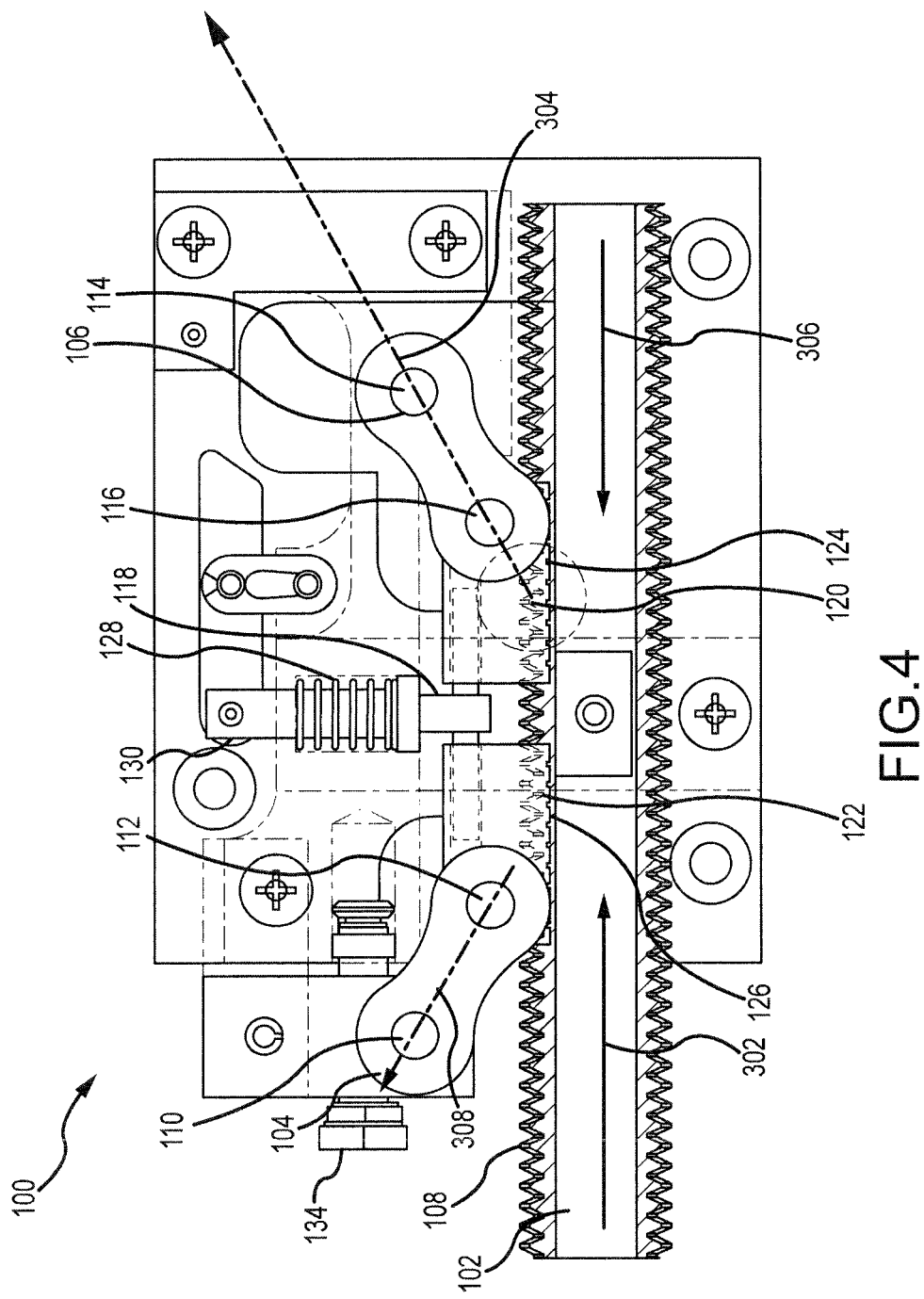
FIG. 4 illustrates a bi-directional linear clutch lock, in accordance with various embodiments.

With reference to FIG. 4, bi-directional linear clutch lock 100 is shown with various forces illustrated for clarity. In that regard, force 302 may represent a force that urges rack 102 to translate along the x axis in a positive x direction. In turn, the interaction of first pawl 120 and rack 102 transfers force 302 along line 304. Accordingly, first pawl 120 prevents and/or retrains rack from translation along the x axis. Improper positioning of first pawl 120 along the x axis may cause line 304 to increase its angle relative to rack 102, which may lead to unwanted slipping and/or disengagement.

In like manner, force 306 may represent a force that urges rack 102 to translate along the x axis in a negative x direction. In turn, the interaction of first pawl 120 and rack 102 transfers force 306 along line 308. Accordingly, second pawl 122 prevents and/or retrains rack from translation along the x axis. Improper positioning of second pawl 122 along the x axis may cause line 308 to increase its angle relative to rack 102, which may lead to unwanted slipping and/or disengagement. As shown in FIG. 4, rack 102 will be constrained from motion along the x axis in response to a force directed along the x axis.

Figure 5:
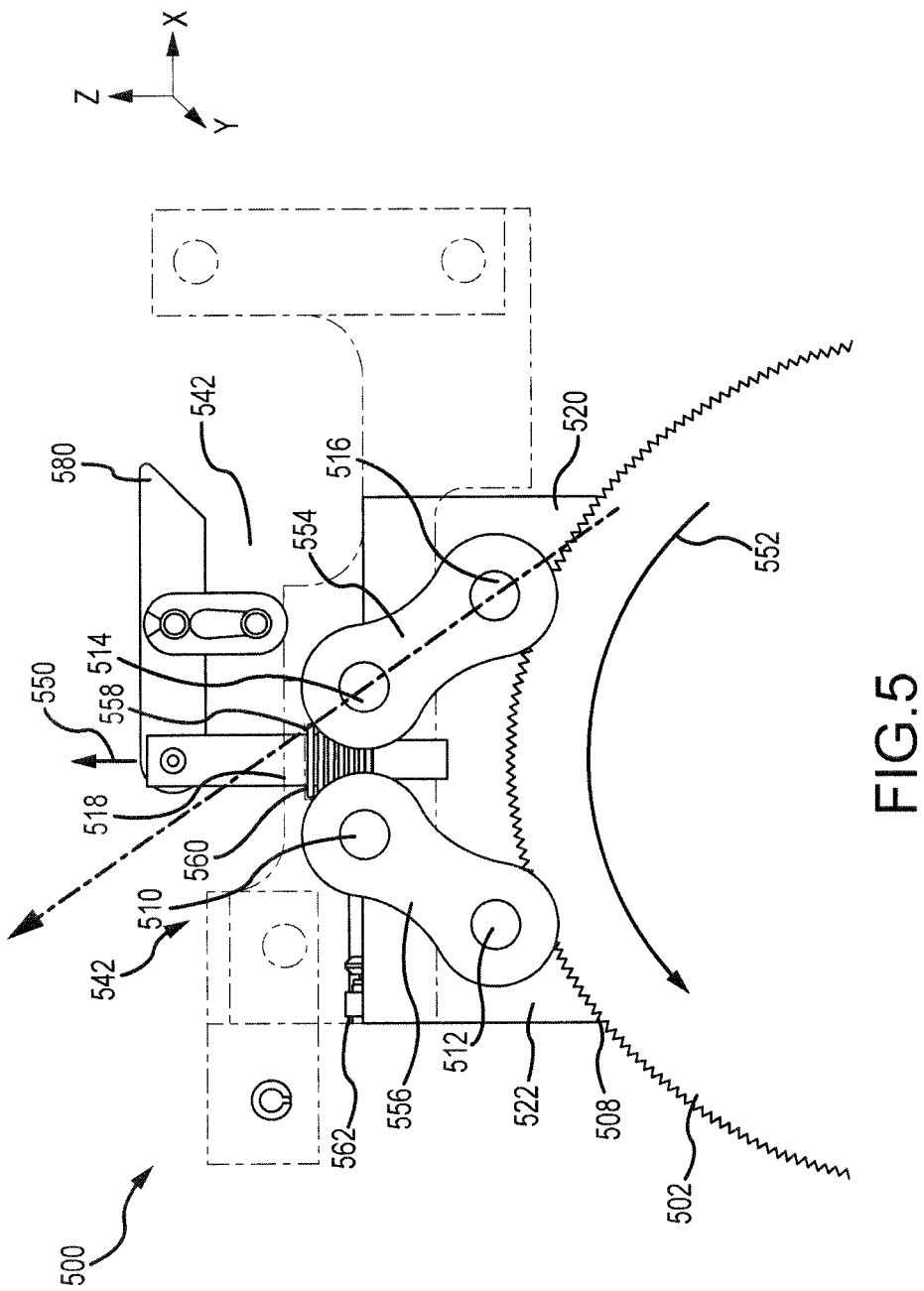
FIG. 5 illustrates a bi-directional rotary clutch lock in an engaged state, in accordance with various embodiments.

With reference to FIG. 5 bi-directional rotary clutch lock 500 in an engaged state is illustrated using an x, y, and z axes for ease of illustration. Rotary rack 502 is shown proximate first pawl 520 and second pawl 522. Rotary rack 502 may be configured to rotate in direction 552. First pawl 520 is pivotably mounted to first clutching link 554 at first pivot mount 516. First pivot mount 516 may comprise a dowel, rod, or other joint that allows first pawl 520 to pivot with respect to first clutching link 554. Second pawl 522 is pivotably mounted to second clutching link 556 at second pivot mount 512. Second pivot mount 512 may comprise a dowel, rod, or other joint that allows second pawl 522 to pivot with respect to second clutching link 556.

First clutching link 554 is pivotably mounted to moveable housing 542 at first housing pivot mount 514. First housing pivot mount 514 may comprise a dowel, rod, or other joint that allows first clutching link 554 to pivot with respect to moveable housing 542. Second clutching link 556 is pivotably mounted to moveable housing 542 at second housing pivot mount 510. Second housing pivot mount 510 may comprise a dowel, rod, or other joint that allows second clutching link 556 to pivot with respect to moveable housing 542. As shown, first housing pivot mount 514 is more proximate to second housing pivot mount 510 than to second pivot mount 512. Stated another way, first housing pivot mount 514 is closer along the x axis to second housing pivot mount 510 than to second pivot mount 512.

In that regard, first pawl 520 and second pawl 522 may move (i.e., may have a degree of freedom) along the z axis in response to first clutching link 554 and second clutching link 556 pivoting about at first housing pivot mount 514 and second housing pivot mount 510. In addition, first pawl 520 and second pawl 522 may move (i.e., may have a degree of freedom) along the x axis in response to pivoting with respect to first clutching link 554 and second clutching link 556. Thus, first pawl 520 and second pawl 522 may be manipulated with respect to rotary rack 502 along the x axis and along the z axis. Alignment along the z axis may cause first pawl 520 and second pawl 522 to engage rotary rack 502, as discussed below. Alignment along the x axis may cause first pawl 520 and second pawl 522 to better engage the rotary rack mating surface 508 of rotary rack 502, as discussed below.

Moveable housing 542 may comprise one or more members configured to move along the z axis. For example, moveable housing 542 may comprise rotating member 580, spring loaded plunger 518 and dowel 560. Dowel 560 traverses spring loaded plunger 518 along the x axis. Spring loaded plunger may comprise spring 558. Spring 558 may be configured to bias spring loaded plunger in a negative z direction and, thus, spring 558 exerts a force on moveable housing 542 in the negative z direction. Thus, with momentary reference to FIG. 6, spring 558 exerts a force in the negative z direction that urges first pawl 520 and second pawl 522 toward rotary rack 502. In turn, first pawl 520 and second pawl 522 are held in contact with rotary rack 502. In response to force 550 exerted on spring loaded plunger 518, the force of spring 558 may be overcome and, depending upon the amount of displacement, a locking mechanism may lock spring 558 in an at least partially compressed state. In that regard, moveable housing 542 may move in a positive z direction. In turn, first pawl 520 and second pawl 522 move along the z axis and may disengage from rotary rack 502. Force 550 may be exerted by rotating member 580.

Moveable housing 542 may comprise backlash adjustment 562. Backlash adjustment 562 may cause one or more members of moveable housing 542 to move along the x axis, both in the positive and negative x directions. In that regard, backlash adjustment 562 may adjust the distance along the x axis between first pawl 520 and second pawl 522. Stated another way, backlash adjustment 562 may adjust the distance along the x axis between first housing pivot mount 514 and second housing pivot mount 510. In this regard, the mating of first pawl 520 and second pawl 522 with rotary rack 502, as described below, may be adjusted. Backlash adjustment 562 may comprise a screw, bolt, or other feature that may move a portion of moveable housing 542 along the x axis.

With reference to both FIGS. 5 and 6, first pawl 520 comprises a first mating surface 566 and second pawl 522 comprises a second mating surface 564. Rotary rack 502 comprises rotary rack mating surface 508. First mating surface 566 and second mating surface 564 may be complementary to rotary rack mating surface 508. In this regard, first mating surface 566 and second mating surface 564 may be configured to mate with rotary rack mating surface 508. First mating surface 566 and second mating surface 564 may be configured to mate with rack mating surface 108 and may comprise, for example, gear teeth comprising any suitable tooth profile, concentric grooves, a sharp V thread, a fine thread, a coarse thread and the like. For example, first mating surface 566 and second mating surface 564 may comprise male threads and rotary rack mating surface 508 may comprise female threads. Mating surfaces may be adjusted depending upon a variety of factors, including how fine or coarse adjustment increments are desired.

With reference to FIG. 6, bi-directional rotary clutch lock is shown in a disengaged state. In that regard, with brief reference also to FIG. 5 to reference the engaged state, the disengaged state comprises first pawl 520 and second pawl 522 not in contact with rotary rack 502. Stated another way, in the disengaged state, first pawl 520 and second pawl 522 are separated from rotary rack 502 along the z axis. In the engaged state, at least a portion of first pawl 520 and second pawl 522 are in contact with rotary rack 502. As described above, spring 558 on spring loaded plunger may urge first pawl 520 and second pawl 522 towards rotary rack 502 until first pawl 520 and second pawl 522 engage rotary rack 502. In that regard, in the engaged state, first pawl 520 and second pawl 522 prevent and/or restrain rotary rack 502 from rotation. With reference to FIG. 5, in that regard, force 552 creates a force line through first pawl 520 and second pawl 522, constraining rotary rack 502 from rotary motion.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A bi-directional linear clutch lock comprising:
a rack;
a first clutching link and a second clutching link, the first clutching link pivotably mounted to a moveable housing at a first housing pivot mount and the second clutching link pivotably mounted to the moveable housing at a second housing pivot mount;
a first pawl pivotably mounted to the first clutching link at a first pivot mount;
a second pawl pivotably mounted to the second clutching link at a second pivot mount;
wherein the first pivot mount is more proximate to the second pivot mount than the second housing pivot mount,
wherein the first pawl and the second pawl are configured to engage the rack in response to movement of the moveable housing towards the rack.

2. The bi-directional linear clutch lock of claim 1, wherein the moveable housing comprises a spring loaded plunger.

3. The bi-directional linear clutch lock of claim 2, wherein the moveable housing comprises a dowel coupled to the spring loaded plunger.

4. The bi-directional linear clutch lock of claim 2, wherein movement of the spring loaded plunger causes movement of the moveable housing towards the rack.

5. The bi-directional linear clutch lock of claim 4, wherein the first pawl has a first mating surface, the second pawl has a second mating surface, and the rack as a rack mating surface.

6. The bi-directional linear clutch lock of claim 5, wherein the first mating surface and the second mating surface are complementary to the rack mating surface.

7. The bi-directional linear clutch lock of claim 1, further comprising a backlash adjustment coupled to the moveable housing.

8. The bi-directional linear clutch lock of claim 1, wherein, in response to engagement of the first pawl and the second pawl with the rack, linear translation of the rack is restrained.

9. A bi-directional rotary clutch lock comprising:
a rotary rack configured to rotate;
a first clutching link and a second clutching link, the first clutching link pivotably mounted to a moveable housing at a first housing pivot mount and the second clutching link pivotably mounted to the moveable housing at a second housing pivot mount;
a first pawl pivotably mounted to the first clutching link at a first pivot mount;
a second pawl pivotably mounted to the second clutching link at a second pivot mount;
wherein the first housing pivot mount is more proximate to the second housing pivot mount than to the second pivot mount,
wherein the first pawl and the second pawl are configured to engage the rotary rack in response to movement of the moveable housing towards the rotary rack.

10. The bi-directional rotary clutch lock of claim 9, wherein the moveable housing comprises a spring loaded plunger.

11. The bi-directional rotary clutch lock of claim 10, wherein the moveable housing comprises a dowel coupled to the spring loaded plunger.

12. The bi-directional rotary clutch lock of claim 10, wherein movement of the spring loaded plunger causes movement of the moveable housing towards the rotary rack.

13. The bi-directional rotary clutch lock of claim 12, wherein the first pawl has a first mating surface, the second pawl has a second mating surface, and the rotary rack as a rotary rack mating surface.

14. The bi-directional rotary clutch lock of claim 13, wherein the first mating surface and the second mating surface are complementary to the rotary rack mating surface.

15. The bi-directional rotary clutch lock of claim 9, wherein, in response to engagement of the first pawl and the second pawl with the rotary rack, rotation of the rotary rack is restrained.

* * * * *